United States Patent [19]

Driver et al.

[11] Patent Number: 5,044,405
[45] Date of Patent: Sep. 3, 1991

[54] METHOD AND APPARATUS FOR REPAIR-LINING OF SHORT SECTIONS OF PIPE

[75] Inventors: F. Thomas Driver; Jeff P. Wells, both of Memphis, Tenn.

[73] Assignee: Insituform Licensees B.V., Netherlands

[21] Appl. No.: 396,238

[22] Filed: Aug. 21, 1989

[51] Int. Cl.⁵ .................. F16L 55/18; B29C 23/22
[52] U.S. Cl. .................................. 138/98; 29/234; 29/426.4; 156/94; 156/294; 264/36; 264/269; 405/150; 425/460; 425/DIG. 109
[58] Field of Search ............ 264/36, 269, 270, 510, 264/512, 516; 156/287, 294, 94, 574; 425/11, 460, DIG. 109, ; 138/97, 98, 100, 120, 178; 405/150, 154; 29/234, 423, 426.4

[56] References Cited

U.S. PATENT DOCUMENTS

| | | | |
|---|---|---|---|
| 3,511,734 | 5/1970 | Darrow | 264/269 |
| 3,960,644 | 6/1976 | McFadden | 156/390 |
| 4,434,115 | 2/1984 | Chick | 264/36 |
| 4,752,511 | 6/1988 | Driver | 264/269 |
| 4,778,553 | 10/1988 | Wood | 156/287 |

Primary Examiner—Jan H. Silbaugh
Assistant Examiner—Mathieu Vargot
Attorney, Agent, or Firm—James & Franklin

[57] ABSTRACT

To facilitate the repair of short sections of pipe by providing a lining in situ, a repair carrier containing the repair lining is moved into position adjacent the pipe length to be lined, the lining is forced out of the carrier into position in the pipe where it is fixed in position and the carrier is then removed from the pipe leaving the lining in place. A flexible tube forming a part of the carrier is used to initially position the lining in the carrier and then to force the lining out from the carrier and urge it against the interior of the pipe, preferably by eversion.

11 Claims, 8 Drawing Sheets

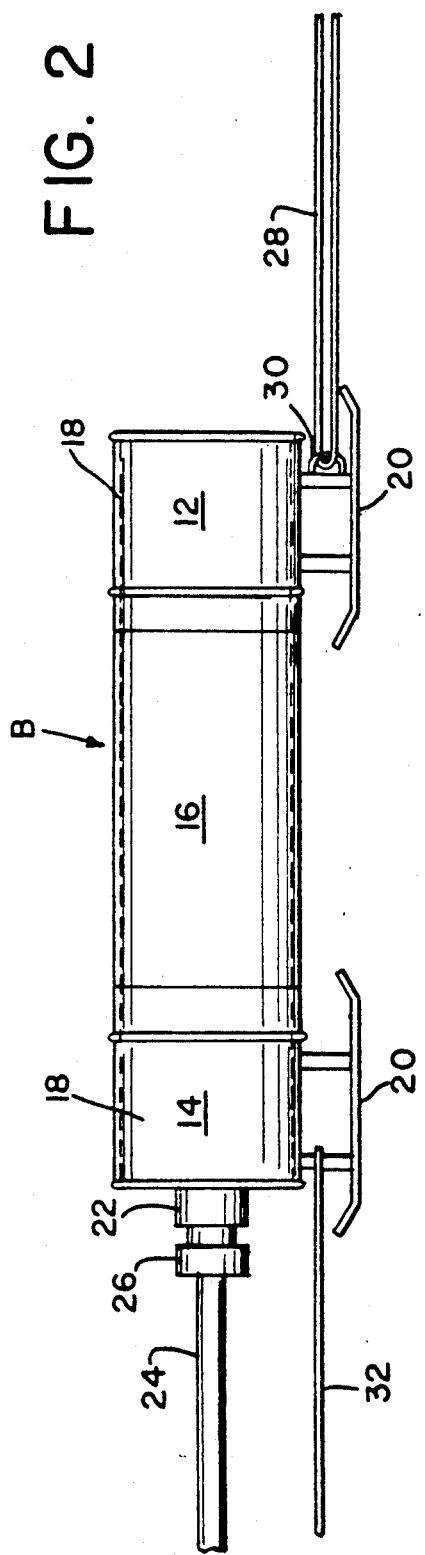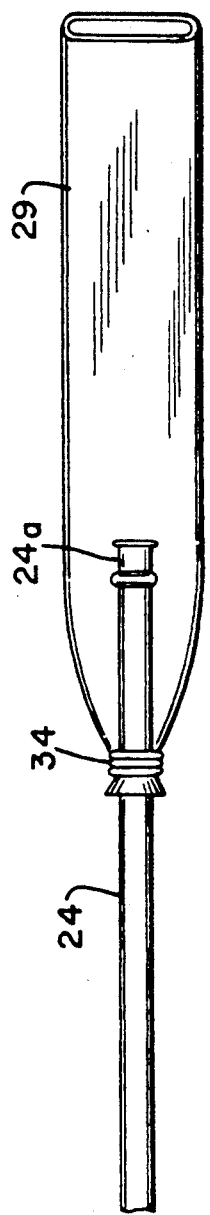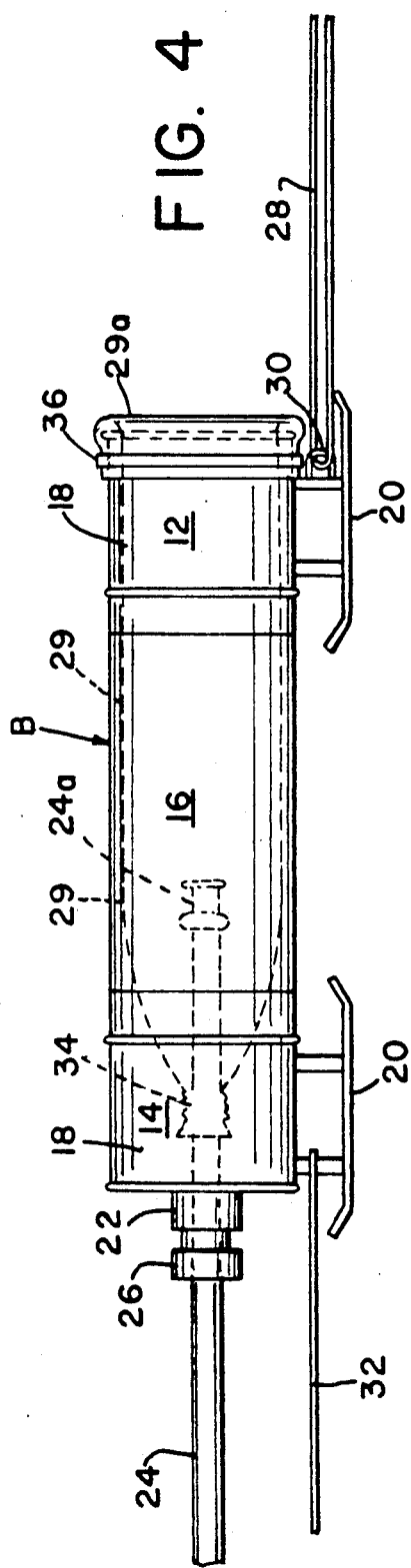

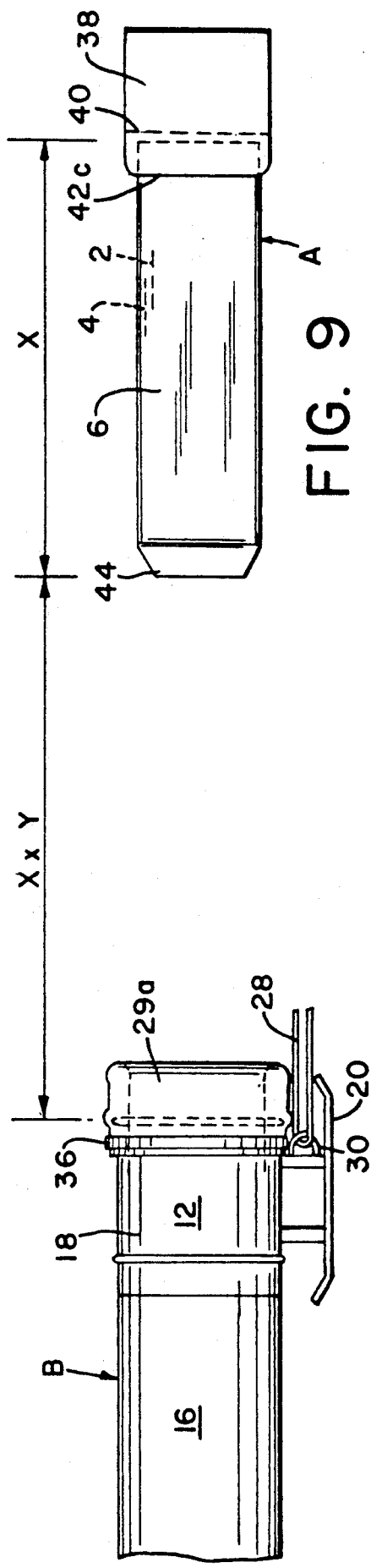
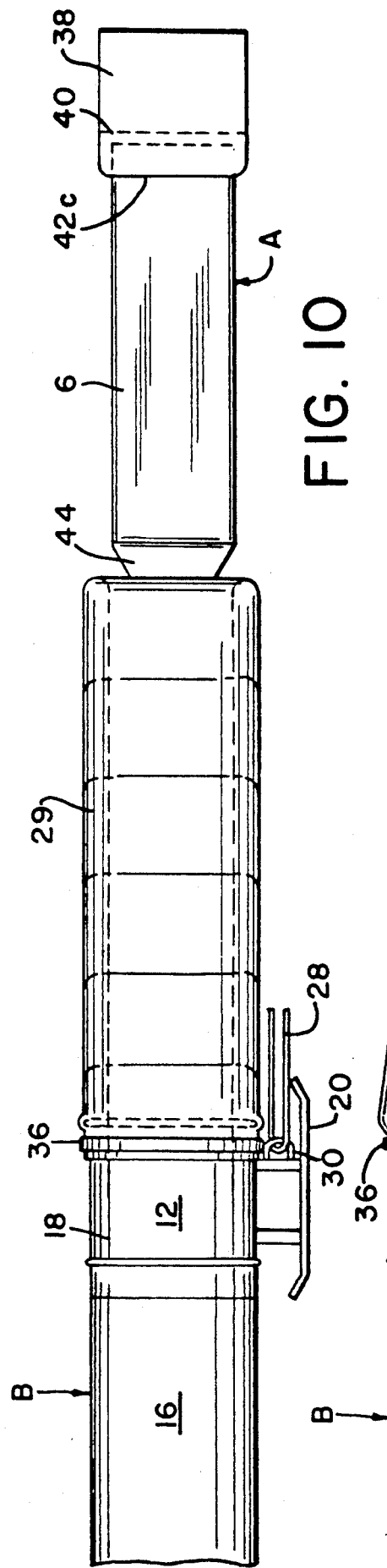
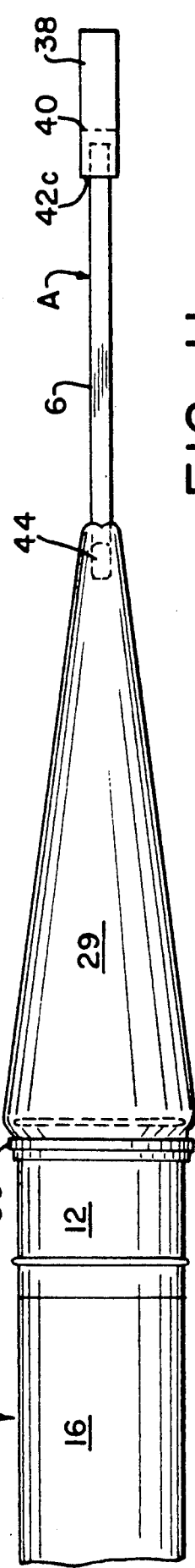

METHOD AND APPARATUS FOR REPAIR-LINING OF SHORT SECTIONS OF PIPE

The present invention relates to method and apparatus for repairing short sections of pipe by lining them. Repair of aging or damaged pipes such as water mains, sewage lines and the like, is an ever-increasing problem as pipe installations age and are subject to deleterious external effects. Removal and replacement of the pipe is frequently economically unviable, particularly when the pipe is located underground or in some other inaccessible location. To solve that serious problem, systems of providing linings in situ for such pipes have been proposed. Various types of lining have been provided, some flexible and some rigid and some flexible when applied but rigidified after application, but in all cases it is preferable that the lining be of a nature such that it closely conforms to and engages the inner surface of the pipeline or passageway. With linings that are flexible or rigid either permanently or initially, that conformity to and engagement with the internal surface of the pipe (the term "pipe" is here used generically to include all types of pipelines or passageways) is accomplished by internally pressurizing the lining.

BACKGROUND OF THE INVENTION

In one widely practiced method of lining pipes, here disclosed by way of example only, certain aspects of which are disclosed in Wood U.S. Pat. No. 4,064,211 of Dec. 20, 1977 entitled "Lining of Passageways", flexible lining tubes are utilized. These tubes comprise a resin-absorbent material which serves to soak up a curable synthetic resin. The resin-impregnated tube, initially flexible, is inserted into the pipe and then forced radially outwardly into engagement with the internal pipe surface by internally pressurizing the flexible tube by means of pneumatic or hydraulic pressure, with or without providing a vacuum in the initial space between the tube and the pipe. After that internal pressurization, the resin with which the tube is impregnated cures, thus producing a rigid lining within the pipe which ideally closely conforms to the entire inner surface of the pipe. These insertion procedures are carried out at relatively widely spaced intervals along the length of the pipe, and in general the lining procedures of the prior art have involved producing a lining continuously from one manhole opening to the next. The longer the lining the more costly is the procedure.

There are instances where the overall condition of a pipe does not warrant complete relining, but a small section of the pipe has failed or been damaged, calling for, in effect, a patch-type of repair rather than an overall reconstruction. Since, as has been pointed out, in most relining processes the lining when positioned must be firmly pressed outwardly into engagement with the inner surface of the pipe, an action which existing technology can readily perform when lining from one manhole to the next, problems have arisen in effecting that outward pressure when only short lining lengths at locations remote from the manhole access openings are involved.

In addition, when a damaged pipe is to be repaired it is quite frequently the case that the inside of that pipe contains foreign material, such as accumulated water and solid fragments, which, if permitted to remain between the new lining and the old pipe, will seriously adversely affect the efficacy of the lining repair. It therefore is important that such foreign material be eliminated from the area where the lining is to be applied, and accomplishing that elimination is often difficult, particular if the pipe is not straight.

Since patch-type repairs of the type under discussion are by no means uniform from installation to installation it is essential that any truly feasible short length repair method and apparatus be readily adaptable to providing repairs of different lengths so as to be adaptable to different situations as they arise.

A truly effective patch-type repair system must not only produce a proper, effective and reliable lining where that lining is needed, but must also do so in a fashion that can be readily performed and controlled remotely and do so at a minimal cost.

SUMMARY OF THE INVENTION

In accordance with the present invention, a patch type repair is accomplished by locating the lining within a carrier which is inserted into the pipe to be repaired and moved to a position adjacent the length to be lined. The lining is then moved out from the carrier into position within the pipe, with the carrier providing means for pressing the lining against the interior of the pipe and causing it to assume its final form. After the lining has been formed in situ, the carrier is separated therefrom and removed from the pipe, ready for reuse as the occasion arises.

In the form here disclosed the carrier assembly includes a flexible tube which is moved out therefrom to engage the lining material, is then moved back into the assembly pulling the lining, and, after the carrier with the lining material in it is properly positioned within the pipe, the tube is moved out from the assembly so as to move the lining along with it into position in the pipe, after which fluid pressure is applied within that tube so as to press the lining against the interior of the pipe. The tube can also be used to provide the heat necessary for expedited setting of the impregnating plastic where present. After the lining has been formed in situ the carrier assembly, including the tube, is separated from the lining and removed from the pipe.

The carrier preferably consists of permanent end members connected by a replaceable flexible tube, the length of the connecting tube corresponding roughly with the length of the lining to be applied, so that different connecting tubes of different lengths can be used with the end members depending upon the particular lining application involved. Hence the carrier assembly can be readily adapted for use with linings of different lengths and is exceptionally effective in bringing those linings to proper location within the pipe and causing them to form rigid linings of optimum characteristics. As will be seen, it is preferred that the lining be everted from the assembly after it has been moved into position, that eversion having the desirable effect of pushing out of the way any accumulated material which may initially be present at the lining location.

It is therefore the prime object of the present invention to provide method and apparatus for the efficient, effective and economical lining of short sections of pipe.

It is a further object of the present invention to provide method and means to position short lining sections within a pipe by means of eversion and to urge them outwardly into engagement with the inner surface of the pipe in order for them to assume their final form.

It is another object of the present invention to provide method and apparatus for lining relatively short pipe lengths which are readily adaptable to different lining requirements, particularly with respect to the desired lining length.

BRIEF DESCRIPTION OF THE DRAWING

To the accomplishment of the above, and to such other objects as may hereinafter appear, the present invention relates to method and apparatus for lining relatively short lengths of pipe, as defined in the appended claims and as described in this specification, taken together with the following diagrammatic drawings in which:

FIG. 2 is a side elevational view of the initial condition of the repair shot carrier assembly of the present invention;

FIG. 3 is a top plan view of the flexible tube which is to be associated with the carrier, together with the jetter hose secured thereto;

FIG. 4 is a view of the carrier assembly after the flexible tube has been incorporated thereinto;

FIG. 9 is a fragmentary side elevational view showing the relative positions of the carrier and the lining preparatory to associating the lining with the carrier;

FIG. 10 is a diagrammatic view illustrating the flexible tube of the carrier being everted to engage the lining;

FIG. 11 is a view similar to FIG. 10 but taken from above showing the flexible tube engaging the lining preparatory to pulling the lining along with it into the carrier;

DESCRIPTION OF THE PREFERRED EMBODIMENT

I here show the lining as of a type generally corresponding to that of U.S. Pat. No. 4,064,211 previously mentioned, but it will be understood that this is by way of exemplification only, and that other types and compositions of lining can be employed in accordance with the instant invention. More specifically, the lining, generally designated A, in connection with which the instant invention is here specifically disclosed, may comprise, before impregnation with a suitable resin, (see FIG. 5) a tube formed of a pair of relatively thick layers 2 and 4 of absorbent material such as felt, with the layer 4 having bonded to its outer surface a thin layer 6 of a suitable plastic material such as polyurethane.

Figure 1:
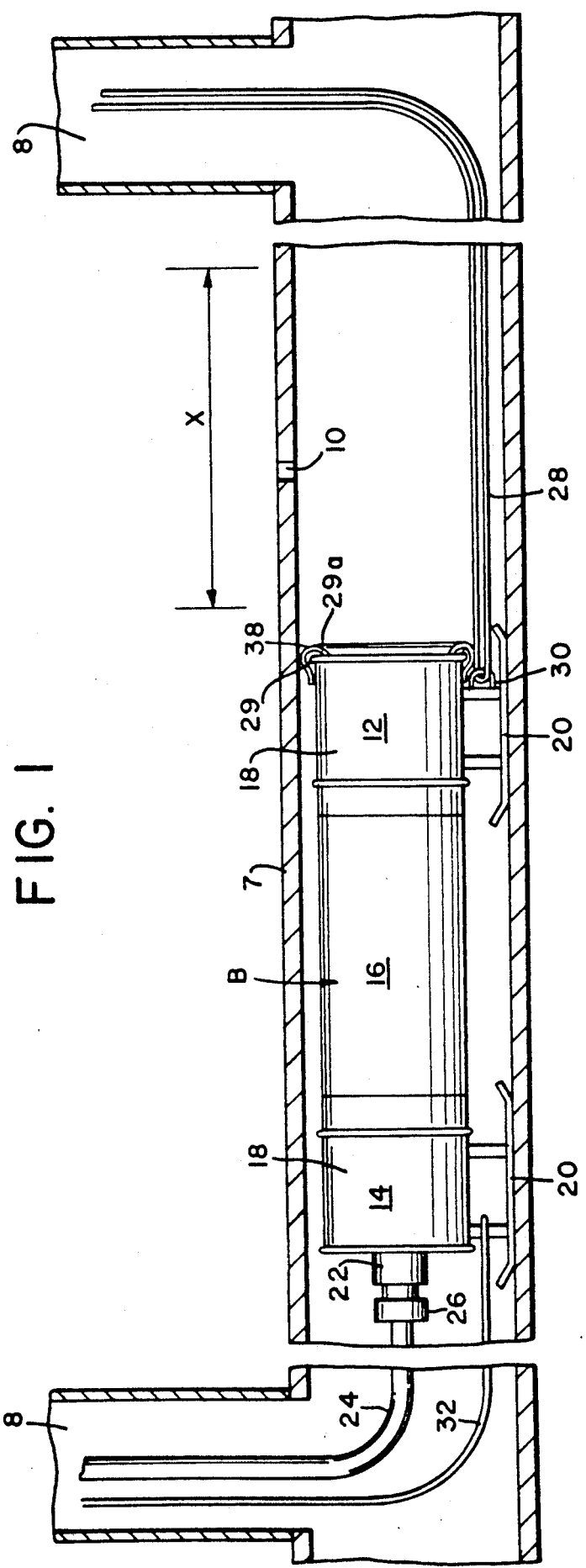
FIG. 1 is a cross-sectional view showing the repair assembly of the present invention in position within a pipe a short section of which is to be lined.

FIG. 1 illustrates a typical environment where a short section lining repair may be called for. The pipe 7 which may, for example, be an underground water conduit, is provided at relatively widely spaced intervals with manhole or other access openings 8. As shown, the pipe 7 is essentially in good repair, except that, for one reason or another, a break has been formed at 10, that break being located sufficiently remote from the manhole openings 8 as to make impractical normal access thereto from one or the other of those openings 8. The break 10, it will be assumed, is of a type that cannot readily be plugged, and therefore repair is feasible only if the interior of the pipe 7 is provided with a permanent inner lining, the length of the lining, as evaluated by the appropriate technical personnel, being represented by distance X in FIG. 1. The problem is, how does one get the lining inside the pipe to the position where it is to remain, and, once the lining is in place, how does one press it outwardly against the inner surface of the pipe and subject it to those conditions that are required in order to form a permanent tube lining. To accomplish the first result—locating the lining—is not particularly troublesome. The lining may simply be pulled along the pipe interior until it comes to the proper position, although that method of location of the lining is not optimal insofar as the removal of accumulated water or debris at the lining location is concerned. How to solve the second problem, however, is by no means obvious. It is to the solving of that second problem, and preferably at the same time mininizing the presence of foreign materials between the lining and the pipe, that the present invention is directed.

One starts (see FIG. 2) with a carrier generally designated B. That carrier comprises leading and trailing preferably rigid end members 12 and 14 respectively, connected by a flexible hose 16. Polyvinyl chloride is an appropriate material for the hose 16. Each of the end members 12 and 14 preferably comprises a body in the form of a metal canister 18 provided with floor-engaging elements 20 such as skids. The canister 18 of the leading end member 12 is open at both ends. The canister 18 of the trailing end member 14 is open at its right end as viewed in FIG. 2 but is closed at its left-hand end, that closed left-hand end being penetrated by a pressure gland 22 provided with neoprene rubber seals through which a jetter hose 24 is sealingly and axially slidably received, a packing nut 26 being provided so as selectively to seal and fix the hose 24 relative to the gland 22 or to release the hose 24 for axial movement. Extending from the leading end member 12 is a line 28 which is threaded through an appropriate fixture 30 so that both ends of the line extend forwardly from the carrier B. Attached to and extending rearwardly from the trailing end member 14 is another line 32. The length of the hose 16 will be approximately that of the distance X which the lining is to cover. Since that distance X will vary from installation to installation, the use of a hose 16 connecting the leading and trailing end members 12 and 14 permits the use of those relatively costly end members in a wide variety of different installations, it being necessary only to use a different inexpensive hose 16 the length of which is chosen to match any particular installation requirements. The hose 16 may be secured to the end members 12 and 14 in any suitable manner, but preferably in a manner which permits the interchangeability of hoses 16 of different lengths. To that end releasable clamping bands may be employed.

The initial assembly of the carrier B, the formation and impregnation of the liner A, and the operative association of the liner A with the carrier B, are all performed outside the pipe 7 at any convenient location, such as the home plant, the interior of a repair supply truck, or on the ground adjacent the top of an access opening 8. The first step is to slide the jetter hose 24 into and through the carrier B until its tip 24a extends forwardly of the leading end member 12. A flexible and fluid-impervious tube 29 of a length somewhat greater than the distance X and formed of a suitable flexible material such as silicone is provided. The forward end 24a of the jetter hose 24 is laid atop the left-hand end of the flattened tube 29, and that tube is wrapped around and banded to the jetter hose at 34, thereby effectively closing the left-hand end of the tube 29 while leaving the end 24a of the jetter hose exposed. Next, as shown in FIG. 4, the jetter hose 24 is pulled to the left, thus drawing the tube 29 into the interior of the carrier B until only a portion 29a of the tube 29 extends forwardly from the exposed end of the leading end member 12. That portion 29a is then cuffed back over the exterior of the leading end member 12 and there secured in any appropriate manner, as by means of the band 36. The carrier B is now ready to receive the lining A.

Figure 5:
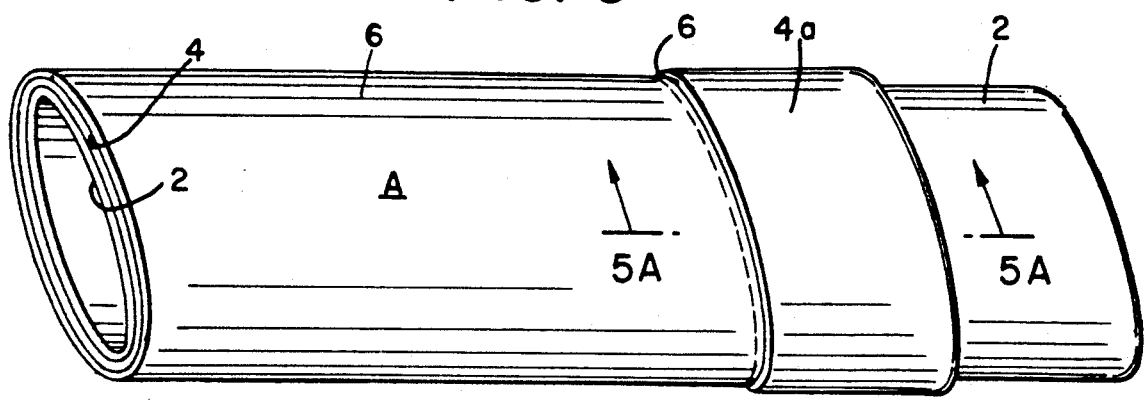
FIG. 5 is a perspective view of a typical lining in an initial stage of its preparation.
Figure 5A:
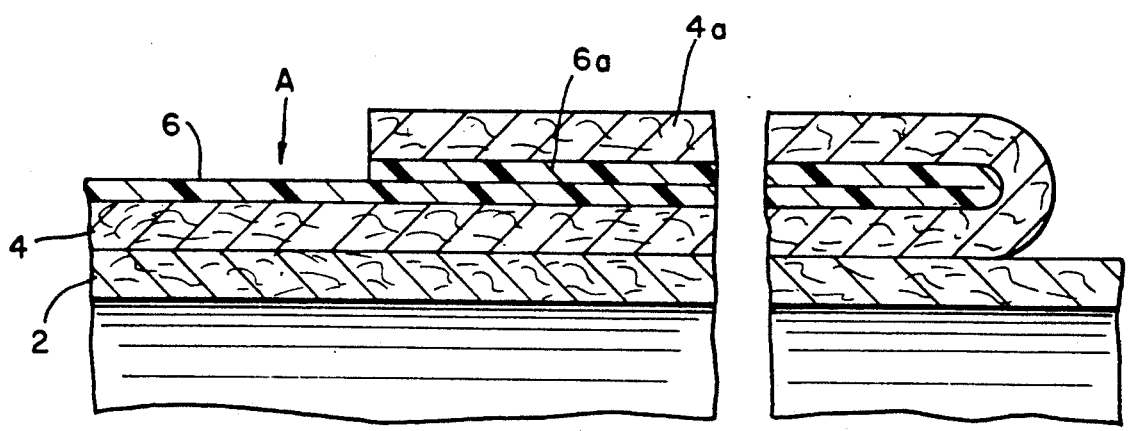
FIG. 5a is a fragmentary cross-sectional view of a preferred lining embodiment
Figure 6:
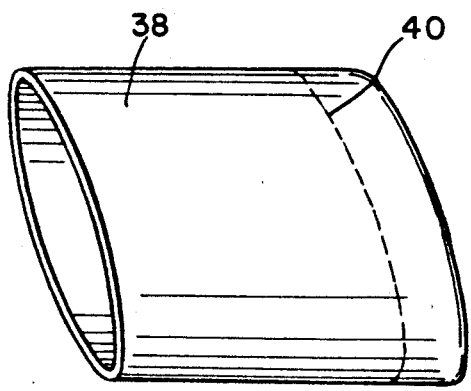
FIG. 6 is a three-quarter perspective view of a frangible sleeve to be associated with the lining.

FIGS. 5-8 illustrate the way in which the lining A is prepared for use in connection with the present invention. In the form here specifically disclosed, and as been indicated, that lining is in the form of a tube comprising layers 2, 4, and 6 of felt, felt and plastic respectively, with the layers 2 and 4 of felt being unbonded to one another and with the plastic layer 6 on the outside and bounded to the felt layer 4. FIG. 5 shows a length of such lining A which is of the length X plus an additional distance such as is appropriate for satisfactory uniform impregnation. The first step, as shown in FIG. 5, is to fold back a substantial amount of the outer felt and plastic layers 4 and 6 to form cuff 4a, cut off some of the inner layer 2 which projects therefrom, and fold the layers 4 and 6 defining the cuff 4a back to their initial extended position. Flame bonding is then preferebly performed between the layers 2 and 4 around the circumference of the tube at both ends thereof.

Figure 7:
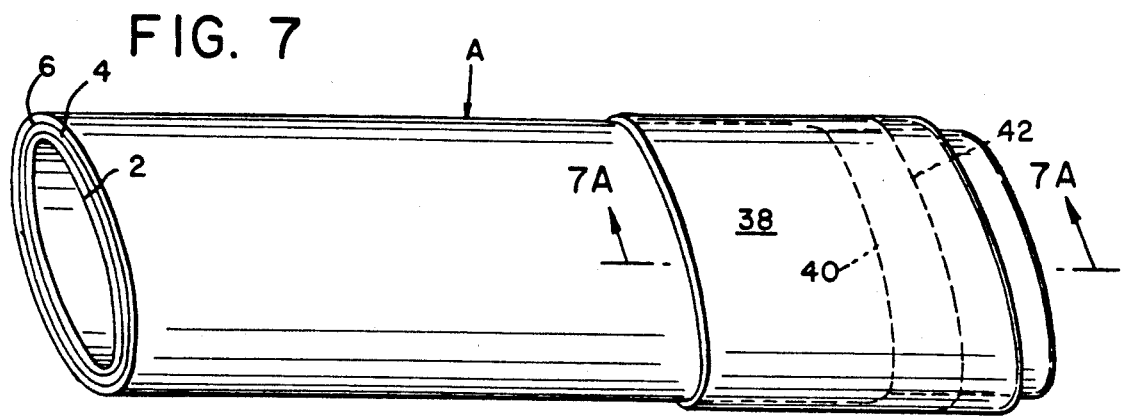
FIG. 7 shows the sleeve of FIG. 6 in position on the lining.
Figure 7A:
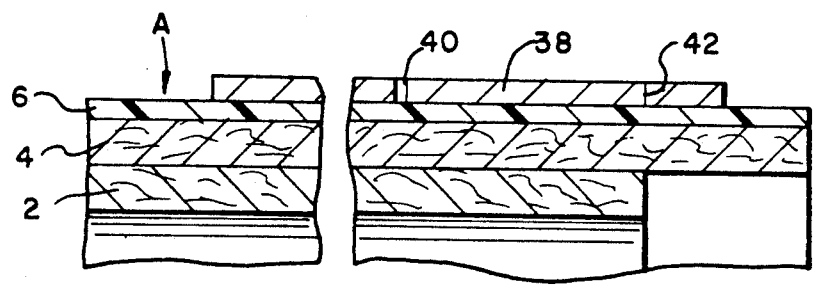
FIG. 7a is a fragmentary cross-sectional view of the sleeve-lining assembly of FIG. 7.

A tubular plastic sleeve 38 formed of a material such as polyurethane (see FIG. 6) is provided, the inner circumference of which is approximately the same as the outer circumference of the lining A. A one foot minimum length is preferred for the sleeve 38. A release agent is preferably applied to the outside surface of the sleeve 38. Approximately one inch from the right-hand end of that sleeve 38 the sleeve is weakened, as by perforations or incisions 40, rendering the sleeve 38 frangible along the line of weakening. That sleeve 38 is then slid snugly over the right-hand end of the lining A of FIG. 5 with the line of perforation 40 close to the right hand and of the lining A, as shown in FIG. 7, with a small portion of the lining A extending out therefrom, and the sleeve 38 is secured to the lining A in any appropriate manner, as by a THF weld, along a line 42 spaced outwardly somewhat from the line 40.

Figure 8A:
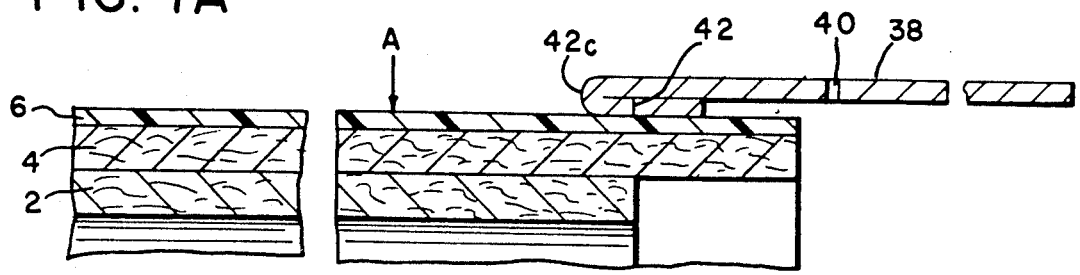
FIG. 8a is a fragmentary cross-sectional view of the sleeve-lining assembly of FIG. 8.
Figure 8:
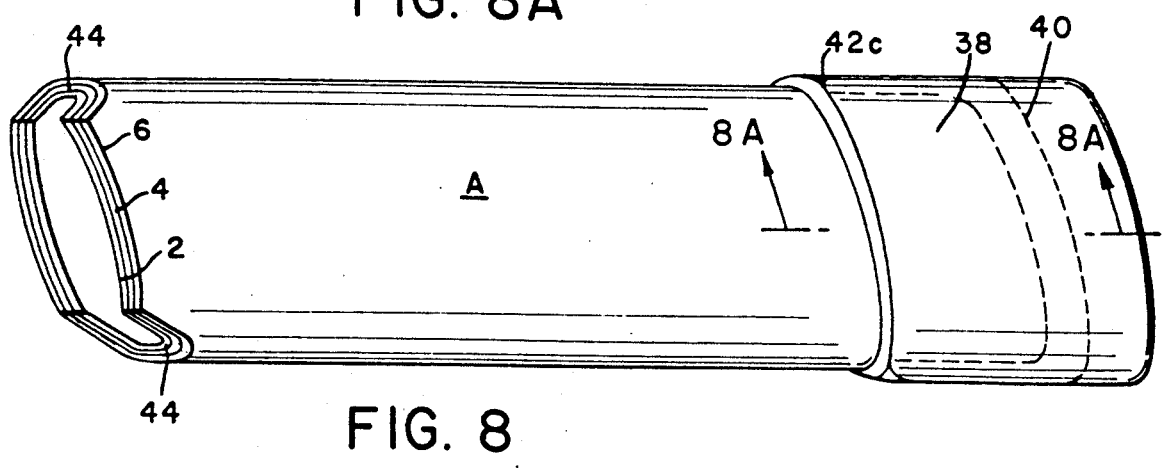
FIG. 8 shows the lining-frangible sleeve combination in its final preliminary form.

The lining is then subjected to a conventional impregnation procedure, using, for example, an epoxy resin as the impregnant, with the resin being supplied inside the lining tube at the left-hand end thereof and with a vacuum being applied at the right-hand thereof to ensure proper resin impregnation substantially all the way through the liner. Thereafter the projecting portion of the lining is cut off (that is the portion where impregnation may not be optimal), the sleeve 38 is folded out past the bonding line 42c so as to extend beyond the end of the lining A, and the left-hand end of that lining preferably has its corners cut off as at 44, as shown in FIG. 8.

To get the liner A into the carrier B, the lining A is positioned as shown in FIG. 9, with its left-hand end spaced from the leading end member 12 of the carrier B by a distance slightly greater that the length of the lining A, here respresented as X plus Y, where Y may be six inches. Fluid under pressure is introduced into the carrier B through the jetter hose, that fluid does not penetrate the tube 29, and, because it is trapped inside the trailing end member 14, the hose 16 and the leading end member 12 it forces the tube 29 out from the leading end member 12, carrying the jetter hose 24 along with it, that movement of the jetter hose being permitted through the gland 22. Since the right hand end of the tube 29 is secured to the leading end member 12 the tube 29 everts as it thus moves outwardly from the carrier B. This continues until, as shown in FIG. 10, the projecting end of the tube 29 reaches and overlaps the left-hand end of the lining A. At this point that lining end is pushed into the projecting end of the tube 29, where it is firmly grasped (see FIG. 11).

Figure 12:
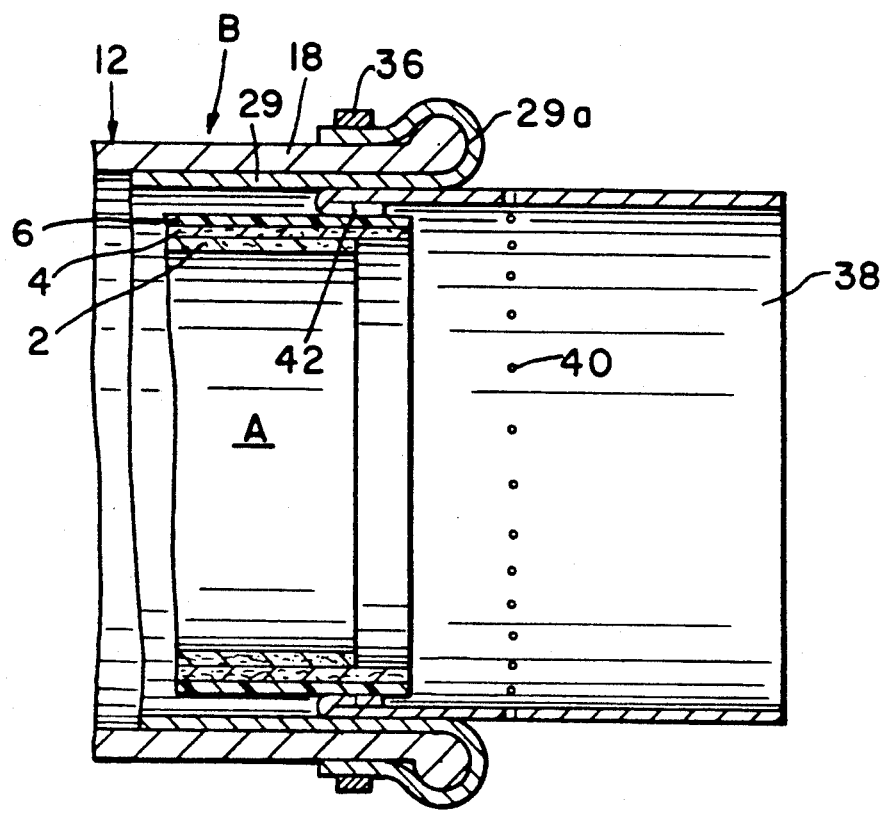
FIG. 12 is a fragmentary cross-sectional view showing the right-hand end of the carrier after the lining has been pulled into it.
Figure 13:
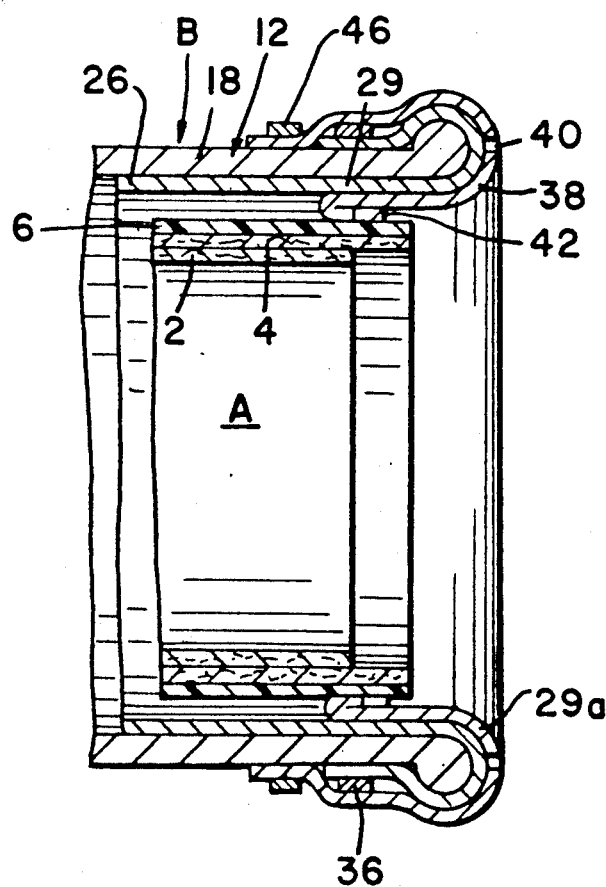
FIG. 13 is a view similar to FIG. 12 but with the frangible sleeve secured in position.
Figure 14:
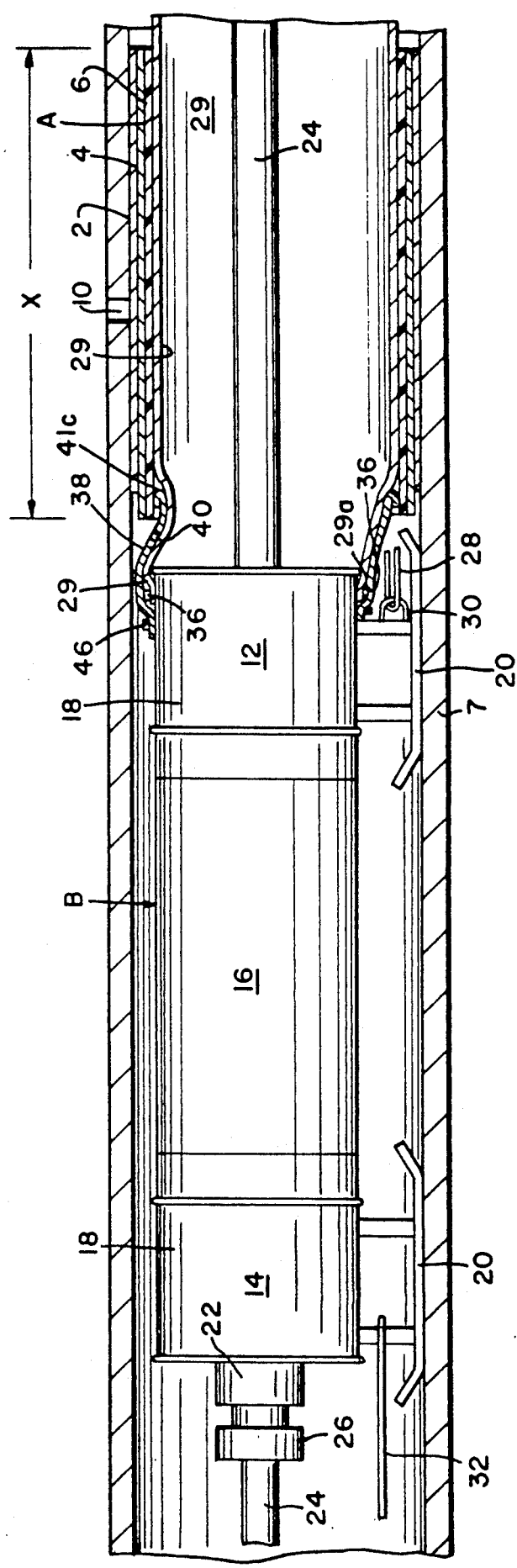
FIG. 14 is a view similar to the central portion of FIG. 1 but with liner moved out from the carrier into position within the pipe.

Next the jetter hose 24 is pulled to the left, which results in the tube 29 re-entering the carrier B, pulling along with it the lining A, which takes up a position inside the tube 29. That continues until, as shown IN FIG. 12, essentially only the sleeve 38 remains outside the carrier B. Next, as shown in FIG. 13, the sleeve 38 is bent back over the leading end of the leading end member 12 and is there secured in position, as by being banded thereto, as at 46.

The carrier assembly B is now fully assembled and ready to use. With the two reaches of the line 28 attached thereto, and with that line threaded through the pipe 6 from one access opening 8 to the next, the carrier B with the lining A therein is introduced into the pipe 6 through for example, the left-hand access opening 8, the jetter hose 24 and the line 32 extending up through that access opening 8, and it is pulled by line 28 to the position shown in FIG. 1, in which its leading end is just short of the beginning of the length X where the lining is to be applied. A television camera located in the pipe can be used to assure proper positioning. Once the carrier B is positioned the line 28 may be removed by releasing one end and pulling the other end until the line 28 disengages from the carrier B.

Fluid pressure is again applied through the jetter hose 24, and, as before, the tube 29 everts as it is forced from the carrier B, but this time the liner A is carried with it and also everts and, because of the eversion, becomes located between the tube 29 and the inner surface of the pipe, with the plastic layer 6 on the inside. Because of the eversion of the liner A along with the tube 29, the movement of the two tubes through the pipe will tend to push before them accumulated water or debris, thus making for a clean joint between the liner A and the interior of the pipe. Restraint may be applied to the jetter hose 24 as it tends to move axially through the carrier B so that during eversion rate may be controlled. When a television camera is employed for monitoring purposes it can be pulled back as the inversion continues so that constant monitoring of the exposed lining-pipe interface can be observed.

The eversion continues until the everted liner A is completely outside the carrier B, at which time it will remain connected to the carrier B by the perforated sleeve 38. At this point the interior of the carrier B, and hence the interior of the tube 29, may be filled with a heat source such as hot water, steam, or hot air so as to accelerate the cure of the impregnating resin in the liner A while the liner is at all times pressed firmly against the inside of the pipe by the pressure within the tube 29. (See FIG. )

Figure 15:
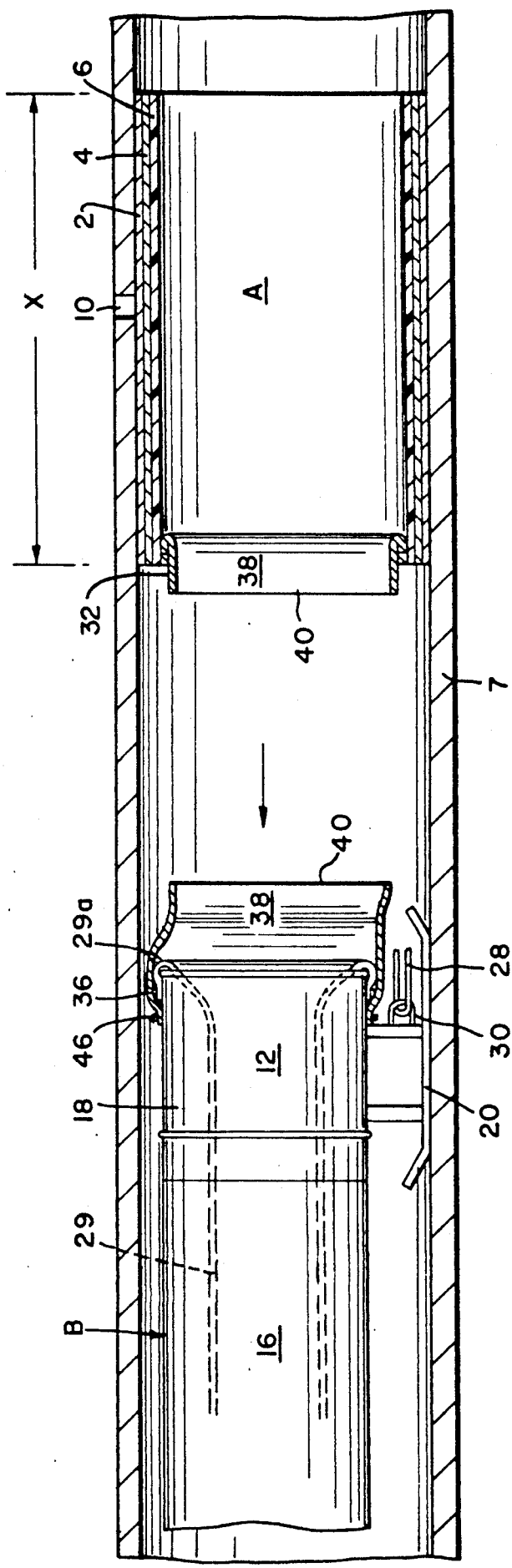
FIG. 15 is similar to FIG. 14 but shows the liner formed in situ and with the carrier in the process of being removed from the pipe.

After a time suitable for curing the impregnant, pressure is relieved from the inside of the tube 29 and the jetter hose 24 is pulled back so as to once again draw the tube 29 into the carrier B, leaving the now cured liner A in position inside the pipe, with one end thereof connected to carrier B by the sleeve 38. Next the line 32 is pulled to draw the carrier B back to and through the left-hand access opening 8. When this is done the sleeve 38 fractures along the line 40, enabling the carrier B to move away from the inside tube liner A (See FIG. 15).

It will be appreciated from the above that through the use of the carrier B, preferably in combination with the tube 29, individual selected lengths of liner A are transported to the precise position where they are to be used, are forced against the interior surface of the pipe so as to conform thereto, and are there permanently formed in situ, all under optimum processing conditions. The carrier is preserved for use in the next short repair installation and it so constructed that it can readily be adapted to short repair installations of different lengths. Manipulation of the various components may be carried out at optimum locations with great facility and reliability. Cost is minimized and the preferred manner of moving the liner into position inherently enhances the cleanliness of the engagement between the liner and the pipe.

While but a single embodiment has been here specifically disclosed, it will be apparent that many variations may be made therein, including, without limitations, variations in the nature and composition of the lining A itself, without departing from the spirit of the invention as defined in the following claims.

We claim:

1. The method of effecting repair of a length of pipe remote at both ends from an access opening to said pipe by applying a lining to said length which comprises putting said lining inside a carrier, locating said carrier within said pipe with one end of said carrier adjacent one end of said length, extending said lining from said carrier and causing it to be located along the inside of said pipe length, fixing said lining in position within said pipe length and removing said carrier from said pipe, including the steps of initially locating a flexible tube within said carrier, securing the leading end of said tube to said carrier adjacent said one end thereof, positioning said lining remote from said carrier, extending said tube from said carrier and engaging said lining with said extended tube, then moving said tube back into said carrier, thereby pulling said lining into said carrier, and thereafter extending said tube from said carrier to thereby cause said lining to extend from the carrier with said tube inside said lining.

2. The method of effecting repair of a length of pipe remote at both ends from an access opening to said pipe by applying a lining to said length which comprises putting said lining inside a carrier, locating said carrier within said pipe with one end of said carrier adjacent one end of said length, extending said lining from said carrier and causing it to be located along the inside of said pipe length, fixing said lining in position within said pipe length and removing said carrier from said pipe, including the steps of initially locating a flexible tube within said carrier, securing the leading end of said tube to said carrier adjacent one end thereof, positioning said lining within said tube, securing one end of said lining to said one end of said carrier by a length of material having a region weakened so as to be frangible, and removing said carrier from said pipe by pulling it away from said positioned lining with a force sufficient to break said weakened region, thus enabling said carrier to be removed from said pipe while leaving said lining in position within said pipe.

3. The method of claim 2, including the steps of positioning said lining remote from said carrier, extending said tube from said carrier and engaging said lining with said extended tube, then moving said tube back into said carrier, thereby pulling said lining into said carrier, and thereafter extending said tube from said carrier to thereby cause said lining to extend from the carrier with said tube inside said lining.

4. The method of any of claims 1-3, in which said carrier comprises a pair of substantially rigid end members separated and connected by a separate comparatively flexible member of a length similar to that of said pipe length to be repaired.

5. In the method of claim 1, providing an enclosed space within said carrier between said carrier and said tube, the interior of said carrier being closed at its end opposite said one end with a fluid-conveying conduit passing through said closed end and communicating with the space between said carrier and said tube, the step of extending said tube from said carrier by passing fluid into said space via said conduit.

6. The method of either of claims 2 or 3, including the step of utilizing a flexible member separate from said lining having said weakened region, securing one end of said flexible member to said lining and securing the other end of said flexible member to said carrier.

7. The method of claim 2, in which the leading end of said lining within said carrier is secured to the leading end of said carrier by a frangible connection and the trailing end of said lining is initially received inside said carrier remote from the leading end thereof, locating said carrier within said pipe with its leading edge adjacent the beginning of said pipe length, and with its body extending longitudinally away from said pipe length, and extending said lining from said carrier while said carrier is essentially stationary, thereby to position the trailing end of said lining adjacent the end of said pipe length.

8. The method of claim 5, in which said conduit is connected to said tube and is caused to axially move through said closed conduit end as said tube is extended from said carrier.

9. A carrier for a length of pipe lining to be applied to the interior of a pipe comprising a substantially cylindrical hollow body with one end open and the other end closed, said body providing a substantially closed fluid communication path between said ends, a flexible tube within said carrier, one end of said tube being secured to the open end of said carrier and having a diameter substantially equal to that of the open end, the other end of said tube being located within said carrier, and a fluid conduit passing through said closed end of said carrier, said conduit being secured to the exterior of said tube adjacent said other end thereof to thereby close said other end of the tube and provide an enclosed space within the hollow body, said conduit in fluid communication with said enclosed space, said conduit being mounted on said closed carrier end so as to be axially movable therethrough as said tube moves out from said carrier.

10. A carrier for a length of pipe lining to be applied to the interior of a pipe comprising first and second end members comprising substantially cylindrical hollow bodies with ends exposed at the ends of said carrier, said end members being separated and connected by a tubular element providing a substantially closed fluid communication path between the hollow interiors of said bodies, a flexible tube within said carrier, one end of said tube being secured to the second of said end members and having a diameter substantially equal to that of said second end member, the other end of the said tube being located within said carrier remote from said second end member, the exposed end of said second end member being open, the exposed end of said first end member being closed, and fluid conduit passing through said closed end, said fluid conduit being secured to the exterior of said tube adjacent to said other end thereof to thereby close said other end of the tube and provide an enclosed space within the hollow interiors of said bodies, said conduit in fluid communication with said enclosed space, said tube being adapted to be engaged with and manipulate the lining for said pipe.

11. The carrier of claim 10, in which said conduit is secured to the exterior of said tube adjacent to the other end thereof, said conduit being mounted on said closed member end so as to be axially movable (through said closed conduit end) therethrough.

* * * * *